United States Patent [19]

Nagano

[11] Patent Number: 4,977,792
[45] Date of Patent: Dec. 18, 1990

[54] BRAKE CONTROL DEVICE FOR USE IN BICYCLE

[75] Inventor: Masashi Nagano, Osaka, Japan

[73] Assignee: Shimano Industrial Co., Ltd., Osaka, Japan

[21] Appl. No.: 379,313

[22] Filed: Jul. 13, 1989

[30] Foreign Application Priority Data

Jul. 15, 1988 [JP] Japan .................... 63-94302[U]

[51] Int. Cl.$^5$ .................... F16C 1/10; G05G 11/00
[52] U.S. Cl. .................... 74/502.2; 74/489; 188/2 D; 188/24.12
[58] Field of Search ........... 74/523, 488, 489, 502.2, 74/531, 522, 525, 526; 188/196 BA, 265, 2 D, 24.12, 24.11

[56] References Cited

U.S. PATENT DOCUMENTS

| | | | |
|---|---|---|---|
| 3,948,361 | 4/1976 | Carlson | 74/489 X |
| 4,667,785 | 5/1987 | Toyoda et al. | 74/502.2 |
| 4,735,106 | 4/1988 | Yoshigai | 188/24.11 |
| 4,759,230 | 7/1988 | Nagano | 188/24.12 X |
| 4,779,482 | 10/1988 | Kawaguchi | 74/489 X |
| 4,840,082 | 6/1989 | Terashima et al. | 74/523 |

FOREIGN PATENT DOCUMENTS

| | | | |
|---|---|---|---|
| 395412 | 2/1909 | France | 74/489 |
| 1141954 | 9/1957 | France | 74/502.2 |
| 2575434 | 7/1986 | France | 74/489 |
| 62-187991 | 11/1987 | Japan | 74/489 |

Primary Examiner—Vinh T. Luong
Attorney, Agent, or Firm—Edwin E. Greigg

[57] ABSTRACT

A brake control device for use in a bicycle, the device includes a compression spring for providing an urging force for returning a brake lever from its operating position to its rest position. The compression spring is disposed between the brake lever and a bracket adjacent a rider's steering handle and is fully enclosed in a housing such as an elastic support capsule.

6 Claims, 3 Drawing Sheets

BRAKE CONTROL DEVICE FOR USE IN BICYCLE

BACKGROUND OF THE INVENTION

1. Field of the Invention

The present invention relates to a brake control device for use in a bicycle, and more particularly to a brake control device of the above-noted type including a bracket attached to a side of a steering handle and a brake lever pivotably supported to the bracket, with an operation on the brake lever from its rest position to its working position, control force transmitting means operatively connected with the lever being moved for braking the bicycle.

2. Description of Related Arts

According to a conventional brake control device of this type, a pair of brake blocks or pads disposed adjacent a front or rear wheel and adapted for braking the same are operated via a pair of brake arms supporting the same, a lifting cable and brake cable are operatively connected in series to the blocks, by a pivotal operation of the brake lever attached to the bracket from its rest position to its working position. Then, a return motion of the brake lever from the working position to the rest position is effected by means of a torsion spring interposed between the pair of brake arms. With this construction, the operation force from the brake lever to the brake blocks is transmitted via the brake cable as a control force transmitting means. However, this construction has the disadvantages that there tends to develop rust on the brake cable as affected by the wind or rain and that mud or dust tends to penetrate into the construction to deteriorate the transmission efficiency thereby to provide mechanical resistance which makes the operation feel heavier or unexpectably different for the bicycle rider.

In view of the above-described problem, there is known an improved construction from a Japanese laid-open utility model No. 62-187991, laid open on Nov. 30, 1987, in which the torsion spring responsible for returning the brake lever to its home position is disposed between the bracket and the brake lever close to the rider's hand so that the return feeling of the brake lever may be less affected by such problems.

Even this construction, however, fails to provide complete protection of the spring against the intrusion of rain or water or against the intrusion of mud or dust which tends to occur in the case of a falling accident of the bicycle.

In view of the above-described state of the art, a first object of the present invention is to provide a brake control device which provides a complete protection against damage or intrusion of mud and other foreign matters to the spring for returning the brake lever.

A second object of the present invention is to construct the above brake control device such that the return spring may perform reliably and stably for an extended service period.

SUMMARY OF THE INVENTION

In order to accomplish the first object, a brake control device, of the invention, for use in a bicycle, comprises: a bracket; a brake lever pivotably supported to the bracket; control force transmitting means operatively connected to the brake lever, said transmitting means being moved for braking the bicycle with a pivotal operation on said brake lever from a rest position to a working position thereof; and an elastic support unit or capsule incorporating and enclosing an elastic member and for elastically urging said brake lever towards said rest position, said elastic support unit being disposed between said bracket and said brake lever.

With the above construction, the elastic support unit is interposed between the bracket and the lever and has its opposed ends operatively connected respectively with these bracket and lever. Further, this elastic support unit accomodates and supports therein the elastic member which urges the unit towards the opening side, the unit completely covering the elastic member. With this construction, the brake lever is returned to its home position by means of the elastic member disposed adjacent the steering handle. Then, even if there occurs deterioration in the force transmisison efficiency in the brake cable as the control force transmitting means, this will not make the braking control force heavier or uncomfortably different for the rider. In addition, since the elastic member responsible for the returning motion of the lever is completely enclosed inside the elastic support unit, the elastic member can be fully protected against damage or foreign matter intrusion and can always perform properly. In this respect, it is conceivable to form the entire brake control assembly (i.e. the bracket and the lever) attached to the handle as an integrally enclosed construction. However, considering the manufacturing and assembly difficulties, the above-described construction of the invention is much superior.

Further, with the invention's construction, the elastic support unit may be handled as one independent unit, which feature will significantly facilitate the assembly of the unit and reduce the possibility of inadvertent loss of the same during the assembly.

According to one preferred embodiment of the present invention, the elastic member comprises a coil type compression spring and the elastic support unit includes a spring cylinder with a spring chamber for accommodating the compression spring and a spring receiving member for receiving one logitudinal end of the compression spring. In the conventional construction, as described hereinbefore, a torsion coil spring has been employed for urging the brake lever towards its rest position. More particularly, this torsion coil spring includes a middle coil body and a pair of spring legs outwardly extending respectively from opposed ends of the coil body in a tangential direction relative to the ends, and the spring provides the necessary urging force via the torsion of the same. On the other hand, with the coil type compression spring employed in the above-described construction of the invention, most of the necessary urging force is provided by contraction and expansion of the same, and this coil type compression spring is distinguishedly superior to the above torsion spring for its longer service life and less manufacturing tolerance which leads to a minimized difference in the performances among the products.

Still further, according to another preferred embodiment of the present invention, the brake lever and the bracket receive the elastic support unit in such a way as to allow contracting and expanding deformations of the compression spring only along the central axis of the spring. With this further feature, the compression spring is subjected only to its own contracting and expanding deformations, such that the spring may serve reliably for a further extended period of time. consequently, this feature will further add to the constant and light operation feeling of the bicycle brake control device of the present invention.

Further and other features and effects of the present invention will become apparent from a more detailed description of the preferred embodiments with reference to the accompanying drawings.

DESCRIPTION OF THE PREFERRED EMBODIMENTS

Figure 1:
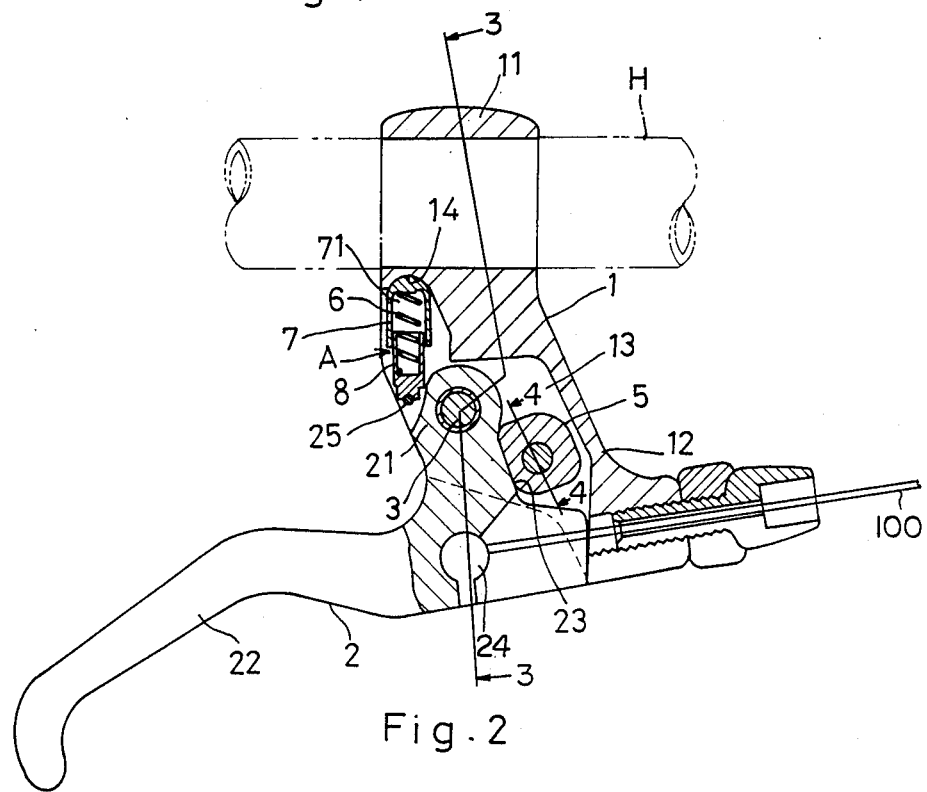
FIG. 1 is a partially cutaway front view of a bicycle brake control device according to one preferred embodiment of the present invention.
Figure 2:
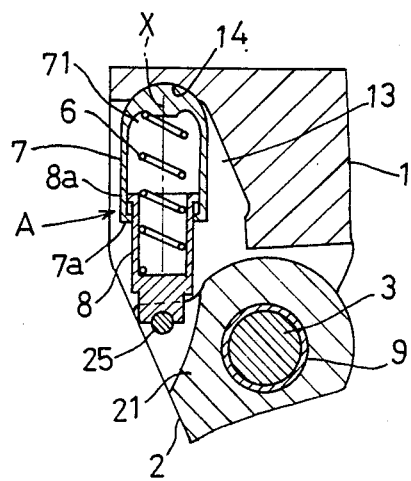
FIG. 2 is a section view showing in an enlarged scale only the major portions of the device of FIG. 1.
Figure 3:
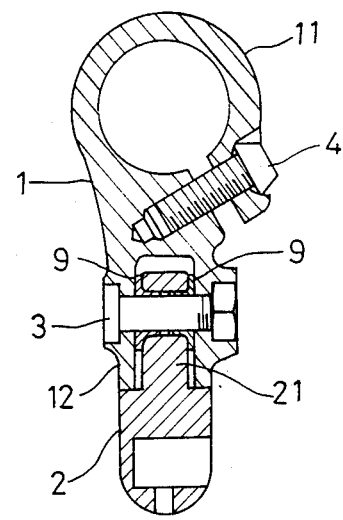
FIG. 3 is a vertically sectional side view taken along line 3—3 of FIG. 1.

Referring to FIGS. 1 and 3, reference numeral 1 denotes a bracket to be fixed to a steering handle bar H. Numeral 2 denotes a brake lever pivotably attached to the bracket 1 via a lever shaft 3. The bracket 1 includes a fixing portion 11 fitted on the handle bar H and fixed thereto by tightening of a tightening bolt 4 and a support portion 12 having a rectangular cross section and including an inner hollow portion 13 for receiving a base 21 of the brake lever 2. Intermediately of the support portion 12, in addition to the lever shaft 3, there is provided an adjusting member 5 for adjusting a rest, i.e. return position of the brake lever 2 relative to the bracket 1 as coming into abutment against the brake lever 2. Further, the support portion 12 forms at leading end positions thereof an insertion hole for a brake control cable 100 as a control force transmitting means operatively connecting between the brake lever 2 and a pair of brake blocks disposed adjacent a driving wheel of the bicycle and also a cable receiver for receiving and supporting an end of the outer tube of the brake control cable.

The brake lever 2 includes the base 21 for pivotally supporting the lever shaft 3 inserted into the inner hollow portion 13 and a control portion 22 extending with a right angle curve from one end of the base 21 and then towards the outside. Also, at one side end of the control portion 22 of the base 21, there is formed a contact face 23 contacting the adjusting member 5, and at a connecting portion with the control portion 22 of the base 21, there is provided a stopper portion 24 for supporting a drum fixedly secured to one end of the brake control cable.

In this embodiment illustrated in FIGS. 1 through 5, between the bracket 1 and the brake lever 2, there is interposed an elastic support unit or capsule A. This elastic support unit A includes a coil type compression spring 6 acting as an elastic member for elastically urging the brake lever 2 towards its rest position, a spring cylinder 7 having a spring chamber 71 for accommodating the compression spring 6, a spring receiver 8 for receiving one longitudinal end of the compression spring 6, with the spring chamber 71 completely enclosing the spring 6.

More particularly, the spring cylinder 7 and the spring receiver 8 are formed respectively as a bottom-equipped cylinder construction. Further, the spring receiver 8 is disposed inside the spring cylinder 7 to be freely movable therein, and the compression spring 6 is interposed between the bottom inner faces of the spring cylinder 7 and the spring receiver 8. With this arrangement, when the brake lever 2 is operated, the compression spring 6 elastically deforms only along the center line X while its displacement from the line X being prohibited by the arrangement.

The spring cylinder 7 and the spring receiver 8 are formed of a synthetic elastic resin material. The spring cylinder 7 forms, in an inner face of its opening, an inwardly oriented annular flange 7a which comes into abutment against the outer peripheral face of the spring receiver 8; whereas the spring receiver 8 forms, in an outer face of its opening, an outwardly oriented annular flange 8a which comes into abutment against the inner peripheral face of the spring cylinder 7. Then, the elastic support unit A is assembled as one integral unit by inserting the annular flange 8a into the spring cylinder 7 through slight elastic deformations of the annular flanges 7a and 8a.

The bracket 1 forms, in a bottom face of its inner hollow portion 13, a first receiving portion 14 which is formed concave to receive and pivotably support the spring cylinder 7. On the other hand, the base 21 of the brake lever 2 forms a second receiving portion 25 which is displaced relative to the above pivot of the cylinder 7 relative to the bracket 1 so as to pivotably support the spring receiver 8. In this embodiment, the second receiving portion 25 comprises a pin disposed in parallel with the lever shaft 3, and this pin is supported between a pair of fork portions opposing each other and formed at one side of the base 21. Also, the bottom end face of the spring receiver 8 is formed as a curved face corresponding to the outer peripheral face of the pin. On the other hand, the bottom end face of the spring cylinder 7 and the first receiving portion 14 come into face contact with each other through their spherical faces.

Figure 4:
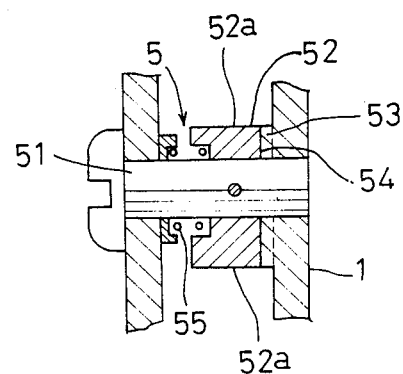
FIG. 4 is a section view taken along line 4—4 of FIG. 1 showing in an enlarged scale only an adjusting member of the device.
Figure 5:
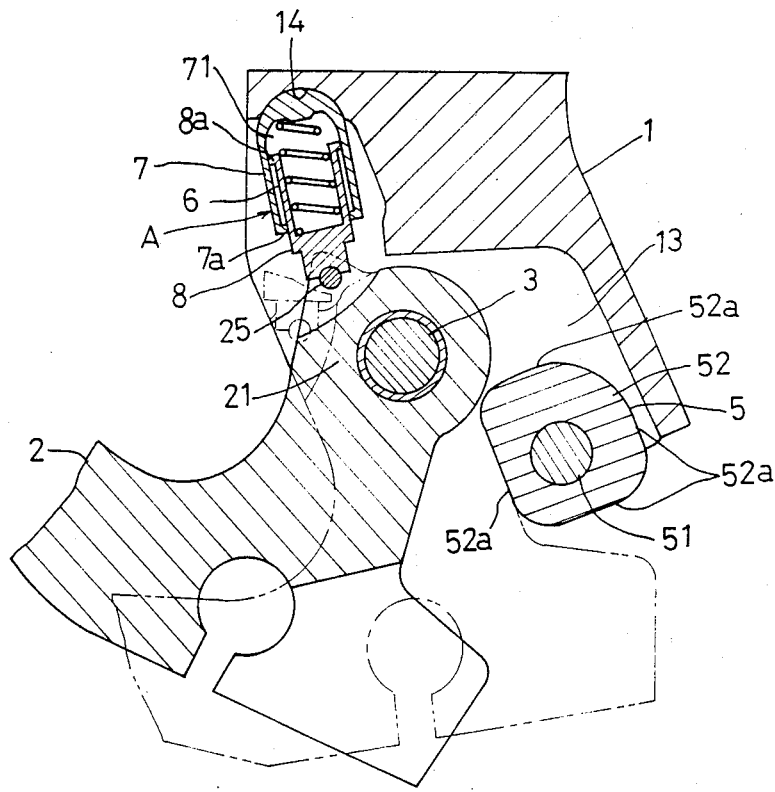
FIG. 5 is a view illustrating operation conditions of the device.

Referring to FIG. 4, the adjusting member 5 includes an adjusting shaft 51 and a regulating element 52 fixedly fitted on an intermediate portion of the shaft 51. Further, the adjusting shaft 51 together with the regulating element 52 is rotatably and axially movably supported to the support portion 12. The regulating element 52 has a plurality of regulating faces having different perpendicular distances from the axis of the adjusting shaft 51. On the other hand, either of the adjusting member 5 and the support portion 12 has a positioning projection 53, whereas the other of the same has a plurality of engaging recesses 54 with one of which the projection 53 comes into selective engagement with a rotation of the adjusting shaft 51 by a predetermined angle. Further, there is provided a pressing spring 55 adapted for urging the adjusting member 5 in a direction for engaging the positioning projection 53 with the engaging recess 54. Then, in operation, by axially moving and then rotating the adjusting member 5 against the urging force of the spring 55, one of the regulating faces 52a is brought into abutment against the contact face 23 of the brake lever 2, thereby to regulate the rest position of the brake lever 2. Incidentally, in FIG. 3, reference numeral 9 denotes a bush fitted on the lever shaft 3.

Next, functions and effects of the bicycle brake control device having the above-described construction will be described.

In a non-operational condition illustrated in FIG. 1, the brake lever 2 is urged towards its rest position by the compression spring 6 of the elastic support unit A. Then, if the brake lever 2 is pivoted clockwise in FIG. 1 for a braking operation, the second receiving portion 25 is displaced clockwise. Simultaneously therewith, while moving into the spring cylinder 7, the spring receiver 8 pivots about the second receiving portion 25 whereas the spring cylinder 7 pivots about the first receiving portion 14. Accordingly, with the above construction, it is possible to elastically deform the compression spring 6 along its center line X without displacing the spring away from the line X. Consequently, this compression spring will perform properly for an extended period of time. Describing other advantages of the above-described construction, the spring cylinder 7 and the spring receiver 8 move each other only through the sliding contacts of their annular flanges 7a and 8a which have a fairly small mutual contact area. Thus, even if mud or the like sticks to a portion of the outer peripheral face of the spring receiver 8 which portion is exposed to the ambience, the spring cylinder 7 and the spring receiver 8 can still move, i.e. slide with each other very smoothly, whereby the brake lever 2 may be operated with a light operation feeling in this case also. It is also conceivable to modify the construction such that one of the spring cylinder 7 and the spring receiver 8 is pivotably supported to the bracket 1 or the brake lever 2 while the other of the same is connected to the one through a slot.

Figure 7:
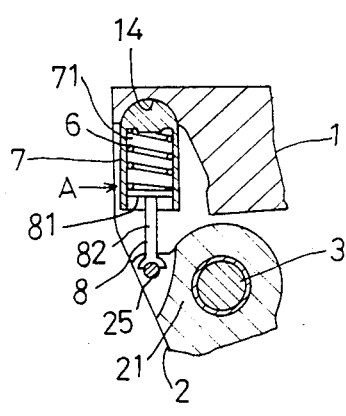
FIGS. 6 and 7 are section views of major portions of further embodiments of the invention respectively.
Figure 6:
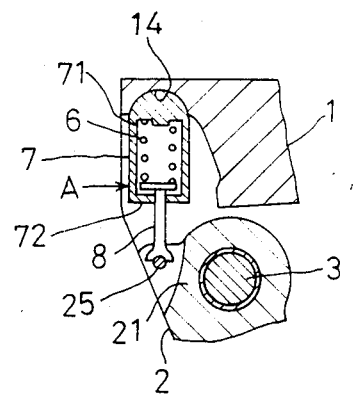

In the above-described embodiment, the spring cylinder 7 is supported to the bracket 1 while the spring receiver 8 is supported to the brake lever 2. Instead, these supporting arrangements may be reversed. Further, in the previous embodiment, the spring receiver 8 is used as the means for closing the spring chamber 71 of the spring cylinder 7. Alternately, as illustrated in FIG. 6, it is conceivable to provide a closing member 72 to the spring cylinder 7 so as to close the spring chamber 71. Further, when the spring receiver 8 is utilized for closing the spring chamber 71, it is conceivable for this spring receiver 8 to include a plate-like closing portion 81 and a shaft portion 82 as shown in FIG. 7, instead of the bottom-equipped construction shown in FIGS. 1 and 2.

Lastly, in addition to the above-described constructions, alternately, it is also conceivable to provide a conventional spring adjacent the brake blocks so as to assist the operation of the elastic support unit adjacent the handle together with for the braking operation of the bicycle.

What is claimed is:

1. A brake control device for use in a bicycle, comprising;
    a bracket,
    a brake lever pivotably supported to the bracket,
    control force transmitting means operatively connected to the brake lever, said transmitting means being moved for braking the bicycle with a pivotal operation on said brake lever from a rest position to a working position thereof, and
    an elastic support capsule incorporating and encapsulating an elastic member and for elastically urging said brake lever towards said rest position, said elastic support capsule being disposed between said bracket and said brake lever.

2. A brake control device as defined in claim 1, wherein said elastic member comprises a coil type compression spring and said elastic support unit capsule includes a spring cylinder with a spring chamber for accommodating a portion of said compression spring and a spring receiver for receiving one longitudinal end of said compression spring.

3. A brake control device as defined in claim 2, wherein said brake lever and said bracket receive said elastic support capsule in such a way as to allow contracting and expanding deformations of said compression spring only along a central axis of said spring.

4. A brake control device as defined in claim 3, wherein said elastic support capsule is supported through abutment of opposing concave faces respectively of said spring cylinder and said bracket and said spring receiver is pivotably supported to said brake lever.

5. A brake control device as defined in claim 2, wherein said spring cylinder forms in on an inner face of its opening an inwardly oriented annular flange which comes into abutment against an outer peripheral face of said spring receiver whereas said spring receiver forms an in an outer face of its opening an outwardly oriented annular flange which comes into abutment against an inner peripheral face of said spring cylinder, said elastic support capsule having its position regulated in an expanding/contracting direction thereof.

6. A brake control device as defined in claim 1 in which said capsule is formed of two separate pieces.

* * * * *